3,161,632
THIAZOLE DYES
James M. Straley and John G. Fisher, Kingsport, Tenn., assignors to Eastman Kodak Company, Rochester, N.Y., a corporation of New Jersey
No Drawing. Filed July 16, 1963, Ser. No. 295,510
7 Claims. (Cl. 260—158)

This invention relates to azo compounds and more particularly to azo compounds obtained by diazotization of certain aminothiazole compounds and coupling with aniline coupling components.

The azo compounds of the invention have the general formula

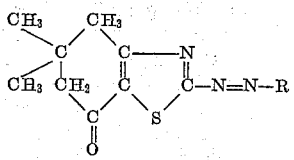

in which R is the residue of an aniline coupling component having the formula

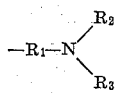

wherein $R_1$=a p-phenylene group including p-phenylene and p-phenylene substituted with for example halogen e.g. bromine or chlorine; alkyl e.g. methoxy; alkoxy e.g. methoxy, dimethoxy; nitro; hydroxyalkoxy e.g. hydroxyethoxy; acylamido e.g. acetamido; fluoroalkyl e.g. trifluoromethyl; alkylsulfonyl e.g. methylsulfonyl, $R_1$ and $R_2$ each=hydrogen; alkyl; halogen e.g. Cl, Br; carboalkoxy e.g. COOCH$_3$; cyanoalkyl e.g. C$_2$H$_4$CN; hydroxyalkyl e.g. C$_2$H$_4$OH; alkoxyalkyl e.g. C$_2$H$_4$OCH$_3$; phenoxyalkyl e.g. C$_2$H$_4$OC$_6$H$_5$; sodium sulfatoalkyl e.g. sodium sulfatoethyl; sodium phosphatoalkyl e.g. sodium phosphatoethyl; acetamido; acyloxy e.g. OCOCH$_3$; carbamoyl; acetoxyalkyl e.g. CH$_2$OCOCH$_3$; fluoroalkyl e.g. CF$_3$, CH$_2$CHF$_2$; haloalkyl e.g. β-chloroalkyl; nitroalkyl e.g. nitroethyl; epoxyalkyl and alkylsulfonamidoalkyl e.g. C$_2$H$_4$NHSO$_2$CH$_3$.

"Residue of an aniline coupling component" has the usual meaning in azo dye chemistry and denotes the residue of aniline or of substituted aniline coupling components, resulting from replacement of the hydrogen atom para to the nitrogen atom, by the diazonium moiety during the coupling reaction. Thus, the residue of the coupling component N,N-di-β-hydroxyethylaniline has the formula

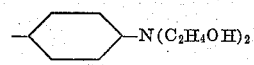

The substituents on the residue are not critical, especially when the azo compounds are used for dyeing textile materials, and function primarily as auxochrome groups to change the color of the azo compound.

"Alkyl," "alkoxy," "hydroxyalkyl" etc. as used herein means the alkyl portion of the group contains a straight or branched lower alkyl chain of 1 to 4 carbon atoms.

Preferred azo compounds having the above formula are described in the examples below and are particularly useful as textile dyes.

The azo compounds of this invention are prepared by diazotizing 2-amino-4,5-(3,3-dimethyl-1-oxotetramethylene)thiazole and coupling in a well known manner with aniline and substituted aniline coupling components such as
m-toluidine,
m-anisidine,
m-chloroaniline,
2-methoxy-5-chloroaniline,
2,5-dimethoxyaniline,
2-methoxy-5-methylaniline,
N-β-hydroxyethylaniline,
N-β-hydroxypropylaniline,
N-β,γ-dihydroxypropylaniline,
2,6-dichloro-4-nitroaniline,
4-nitro-2-trifluoromethylaniline,
3-acetamido-6-ethoxyaniline,
2-methylsulfonyl-4-nitroaniline,
N-β,β-difluoroethylaniline,
N-γ-hydroxypropylaniline,
N-δ-hydroxybutylaniline,
N-β-hydroxyethyl-o-chloroaniline,
N-β-hydroxyethyl-o-methoxyaniline,
N-β-cyanoethylaniline,
N-β-methoxyethylaniline,
N-β-ethoxyethylaniline,
N-β-carbomethoxyethyl-m-toluidine,
N-β-carboethoxyethyl-m-chloroaniline,
N,N-di-β-hydroxyethylaniline,
N,N-di-β-hydroxyethyl-m-chloroaniline,
N,N-di-β-hydroxyethyl-m-toluidine,
N-ethyl-N-β,γ-dihydroxypropyl-m-toluidine,
N-ethyl-N-(β-methyl-β,γ-dihydroxypropyl)aniline,
N-butyl-N-(β-sodium sulfatoethyl)-m-toluidine,
N-β-cyanoethyl-N-(β-sodium phosphatoethyl)-m-chloroaniline,
N-methyl-N-β,γ-dihydroxypropyl-m-toluidine,
N-β-methoxyethyl-N-β,γ-dihydroxypropyl-m-toluidine,
N,N-di-β-hydroxyethyl-m-bromoaniline,
N-ethyl-N-δ-hydroxybutylaniline,
N-β-hydroxyethyl-N-β,β,β-trifluoroethylaniline,
N-β-hydroxyethyl-N-γ,γ,γ-trifluoropropylaniline,
N-β-hydroxyethyl-N-δ,δ,δ-trifluorobutylaniline,
N-β-hydroxyethyl-N-β,β-difluoroethylaniline,
N-β-hydroxypropyl-N-γ,γ-difluoropropylaniline,
N-β-hydroxyethyl-N-β,β-difluoropropylaniline,
N-β,γ-dihydroxypropyl-N-γ,γ-difluorobutylaniline,
N-β,γ-dihydroxypropyl-N-δ,δ-difluoroamylaniline,
N-methyl-N-β-hydroxyethyl-m-bromoaniline,
N,N-di-β-hydroxyethyl-2,5-diethoxyaniline,
N,N-di-β-hydroxyethyl-2,5-dichloroaniline,
N-n-propyl-N-β-hydroxyethylaniline,
N-isopropyl-N-β-hydroxyethylaniline,
N-n-butyl-N-β-hydroxyethylaniline,
N-β-hydroxyethyl-N-cyanoethyl-m-chloroaniline,
N-β-hydroxyethyl-N-γ-cyanopropylaniline,
N-β-carbomethoxyethylaniline,
N-β-carboethoxyethyl-N-β-hydroxyethylaniline,
N-β-carbomethoxyethyl-N-β-hydroxyethyl-m-chloroaniline,
N-β-hydroxyethyl-N-β-chloroallylaniline,
N-β-hydroxyethyl-N-β-nitroethylaniline,
N-methyl-N-β-chloroethylaniline,
N-ethyl-N-β-chloroethylaniline,
N-ethyl-N-β-chloroethyl-m-chloroaniline,
N-β-hydroxyethyl-N-β-chloroethylaniline,
N-ethyl-N-β-bromoethylaniline,
N-ethyl-N-β-bromoethyl-m-anisidine,

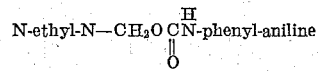

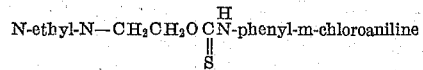

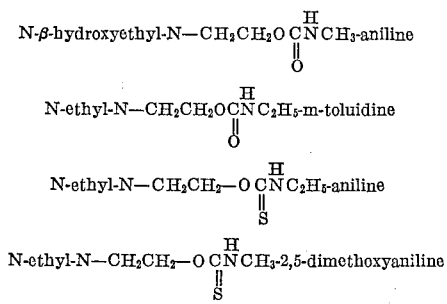

N-methyl-N-(2,3-epoxypropyl)aniline,
N-ethyl-N-(2,3-epoxypropyl)aniline,
N,N-di-(2,3-epoxypropyl)aniline,
N,N-di-(β-chloroethyl)aniline,
N,N-di-(β-bromoethyl)aniline,
N-ethyl-N-(γ-chloro-β-hydroxypropyl)aniline,
N,N-di-(γ-bromo-β-hydroxypropyl)aniline and
N-β-methoxyethyl-N-(γ-chloro-β-hydroxypropyl)aniline.

2 - amino-4,5-(3,3-dimethyl-1-oxotetramethylene)-thiazole is prepared from bromodimedon as described in Example 1 below.

The azo compounds can be used for dyeing textile materials including synthetic polymer fibers, yarns and fabrics giving fast red to violet shades when applied by conventional dyeing methods to cellulose ester and polyester fibers. The azo compounds have moderate affinity for polyamide fibers and possesses the valuable property of staining wool less than do previous thiazole dyes. When the azo compounds are used for dyeing such hydrophobic materials, they should be free of water-solubilizing groups such as sulfo and carboxyl groups. In general the dyes have good fastness, for example, to light, washing, gas (atmospheric fumes) and sublimation. The dyes are useful in application and discharge printing.

The following examples will serve to illustrate the preparation and use of the azo compounds of our invention.

*Example 1.—Preparation of 2-Amino-4,5-(3,3-Dimethyl-1-Oxotetramethylene)Thiazole*

A solution of 86 g. bromodimedon (Ann. 322,248) and 29.9 g. of thiourea in 1 l. of ethyl alcohol was heated at reflux for 7 hours. The alcohol was evaporated and the residue dissolved in 400 ml. of water. The filtered aqueous solution was treated with sufficient 50% sodium hydroxide solution to make basic. The precipitated product was filtered, washed with water and dried at 60° C. The yield of 2-amino-4,5-(3,3-dimethyl-1-oxotetramethylene) thiazole was 39 g. having a melting point of 202–5° C.

Recrystallization from 50% alcohol-water raised the melting point to 206–7.5° C.

| Analysis | Theory | Found |
|---|---|---|
| C | 55.1 | 55.3 |
| H | 6.17 | 6.12 |

*Example 2.—Preparation of Azo Dye*

To a cooled solution of 0.72 of sodium nitrite in 5 ml. of sulfuric acid, was added 10 ml. of 1–5 acid (1 part propionic–5 parts of acetic acids; hereafter referred to as 1–5 acid). The temperature was lowered to 3° C. and 1.96 g. of finely ground 2-amino-4,5-(3,3-dimethyl-1-oxo-tetramethylene)thiazole was added at such a rate that the temperature did not exceed 5° C. Then a second portion of 10 ml. of 1–5 acid was added keeping the temperature below 5° C. The diazotization mixture was stirred at 3 to 5° C. for 2 hours. This diazonium solution was then added to a cooled solution of 1.88 g. of N,β-cyanoethyl-N-ethyl-m-toluidine in 30 ml. of 1–5 acid. The mineral acid was neutralized by careful addition of solid ammonium acetate with cooling of the coupling mixture. After two hours standing with intermittent stirring the dye was isolated by addition of 600 ml. of water, filtering, washing with water, and drying at room temperature. This dye imparts violet shades to cellulose acetate which show excellent fastness properties.

The dye has the formula

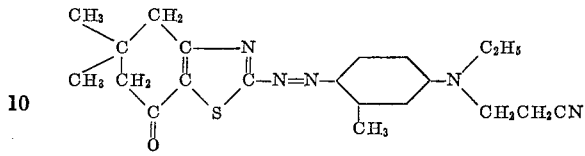

*Example 3*

The diazonium solution prepared as in Example 2 was added to a cooled solution of 2.04 g. of N,β-cyanoethyl-N,β-hydroxyethyl-m-toluidine in 30 ml. of 1–5 (propionic-acetic) acid. With stirring and cooling below 10° C. the coupling mixture was neutralized to Congo brown by portionwise addition of ammonium acetate. The coupling was then allowed to proceed without cooling until complete as shown by a negative diazo reaction with a test paper spotted with R-salt. The dye was isolated by drowning in 800 ml. of water, filtering and washing well with water. The resulting dye imparts red-violet shades to cellulose acetate textile material which exhibits excellent fastness properties.

*Example 4*

The diazo solution prepared as in Example 2 was added to an externally cooled solution of 1.62 g. of N,β-cyanoethyl-N-methyl aniline in 25 ml. of 1–5 acid. After allowing the coupling to proceed at 5 to 10° C. for 1 hour with intermittent stirring, the coupling mixture was treated with sodium acetate to raise the pH to 4, taking care that the temperature does not exceed 10° C. during neutralization of the mineral acid. The dye formation was then completed by stirring without further cooling until complete as indicated by the R-salt coupling test. The dye was then isolated in the manner described in Example 3. It dyes cellulose acetate textile materials in bluish-red shades.

*Example 5*

1.96 g. of 2-amino-4,5-(3,3-dimethyl-1-oxotetramethylene)thiazole was added to 24 ml. of water in a three neck round bottom flask fitted wtih a stirrer. Then 17 ml. of $H_2SO_4$ ($d=1.84$) was added with stirring. The solution of the amine was cooled to 3° C. and treated with a solution of nitrosyl sulfuric acid prepared from .72 g. $NaNO_2$ and 5 ml. of conc. $H_2SO_4$. This addition was carried out in such a manner that the temperature did not exceed 5° C. The formation of the diazonium salt was completed by stirring for two hours at 3 to 5° C. This diazo solution was added to a solution of 1.74 g. of N,β-cyanoethyl-N-ethylaniline in 35 ml. of 1–5 acid cooled in an ice bath. The mineral acid in the coupling mixture was neutralized by addition of solid ammonium acetate keeping the temperature below 10° C. After two hours coupling without further cooling the dye was isolated by diluting with 800 ml. of $H_2O$, filtering off the dye and washing with water. This dye imparts red shades to cellulose acetate textile material which have excellent fastness properties.

*Example 6*

The diazo solution prepared according to Example 5 was added to a solution of 2.32 g. of N,β-acetoxyethyl-N,β-cyanoethyl aniline in 30 ml. of 1–5 acid. The coupling was carried out as described above. This dye gives red shades on cellulose acetate textile material.

Other azo compounds illustrating our invention and having the above general formula are prepared in the manner of Example 2 by diazotizing 2-amino-4,5-(3,3- dimethyl-1-oxotetramethylene)thiazole and coupling with the aniline coupling components of the following table.

| Example | Coupling Component | Color on Cellulose Acetate |
|---|---|---|
| 7 | N,N-di-β-hydroxyethylaniline | Violet. |
| 8 | N,β-hydroxyethyl-N-ethylaniline | Do. |
| 9 | N,β-hydroxypropyl-o-toluidine | Red-violet. |
| 10 | N,β-cyanoethyl-N,β-hydroxyethyl-m-chloroaniline | Red. |
| 11 | N,N-di-β-hydroxyethyl-m-chloroaniline | Violet. |
| 12 | N-glyceryl-2-methoxy-5-acetamido-aniline | Blue. |
| 13 | Diphenylamine | Red-violet. |
| 14 | N,N-dimethylaniline | Violet. |
| 15 | N,N-di-β-hydroxyethyl-m-toluidine | Do. |
| 16 | N-ethyl-N,β-methanesulfonamidoethyl-m-toluidine | Do. |
| 17 | N,β-cyanoethyl-N-cyclohexylaniline | Red-violet. |
| 18 | N,β-cyanoethyl-N,β-hydroxyethylaniline | Red. |
| 19 | Aniline | Scarlet. |
| 20 | N-butyl-N,β-hydroxyethylaniline | Violet. |
| 21 | N-ethyl-N-B,γ-dihydroxypropyl-m-toluidine | Do. |
| 22 | N,β-hydroxyethyl-o-chloroaniline | Red. |
| 23 | N-cyclohexyl-N-B,γ-dihydroxypropylaniline | Violet. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 3,043,827. The following example illustrates methods by which the azo compounds of the invention can be used to dye textile materials.

0.1 gram of the dye is dissolved in the dye pot by warming in 5 cc. of ethylene glycol monomethyl ether. A 2% Igepon T and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

Cellulose esters which can be dyed with the azo compounds include cellulose aliphatic carboxylic acid esters having 2 to 4 carbon atoms in the acid groups thereof, by which we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthtlate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber yarn and fabric form, is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compound having the formula

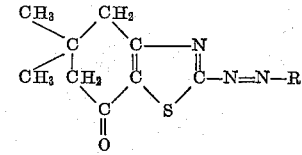

wherein R represents the residue of an aniline coupling component.

2. Azo compounds having the formula

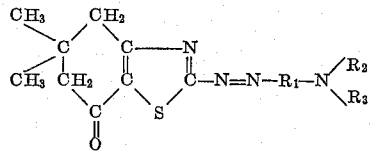

wherein
$R_1$ = a p-phenylene group,
$R_2$ and $R_3$ each = a member of the class consisting of hydrogen, phenyl, alkyl, cycloalkyl, hydroxyalkyl, alkoxyalkyl, cyanoalkyl, carboalkoxyalkyl, haloalkyl, alkylsulfonamidoalkyl, acyloxyalkyl, halohydroxyalkyl, nitroalkyl, epoxyalkyl, the alkyl groups of which are lower alkyl.

3. The compound having the formula

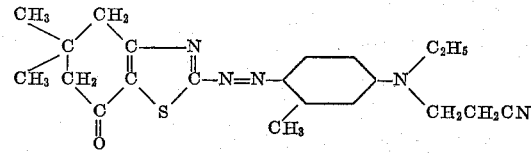

4. The compound having the formula

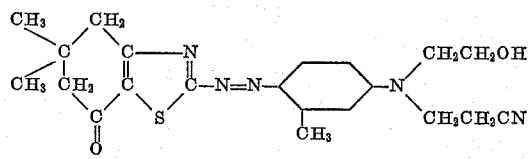

5. The compound having the formula

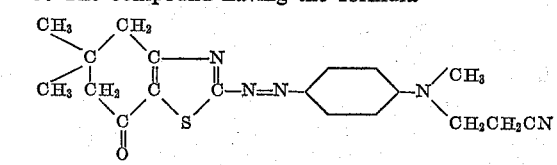

6. The compound having the formula

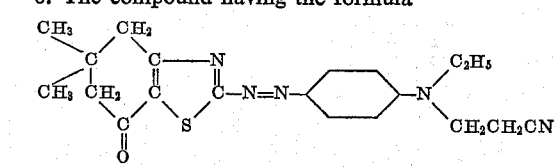

7. The compound having the formula

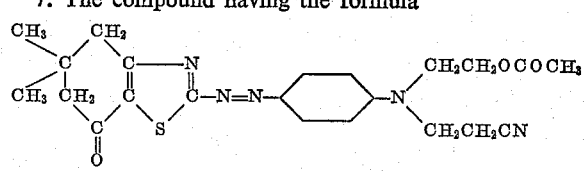

No references cited.